United States Patent

[11] 3,576,993

[72] Inventor Gunnar Hagg
 Uppsala, Sweden
[21] Appl. No. 791,731
[22] Filed Jan. 16, 1969
[45] Patented May 4, 1971
[73] Assignee Incentive Research & Development AB
 Bromma, Sweden
[32] Priority Jan. 25, 1968
[33] Sweden
[31] 1021/1968

[54] X-RAY CAMERA FOR X-RAY DIFFRACTION ANALYSIS ACCORDING TO GUINIER
 11 Claims, 11 Drawing Figs.
[52] U.S. Cl. .................................................. 250/51.5
[51] Int. Cl. .............................................. G01n 23/20
[50] Field of Search .......................................... 250/51.5, 49.5 (8)

[56] References Cited
UNITED STATES PATENTS
3,379,876 4/1968 Dasgupta .................... 250/51.5

Primary Examiner—James W. Lawrence
Assistant Examiner—A. L. Birch
Attorney—Waters, Roditi, Schwartz & Nissen ABSTRACT: An X-ray camera for X-ray diffraction analysis of powderous material according to the Guinier method, which camera comprises an airtight and evacuatable casing having a radiation entrance window for X-ray radiation, in which casing all the components of the camera, as a crystal holder for a monochrometer crystal, a specimen holder for the specimen to be analyzed and a film holder, are mounted. The crystal holder is preferably removably mounted on a support plate which is rotatable about an axis perpendicular to the direction of the X-ray radiation incident through the entrance window of the casing. A support and guide rail can be mounted or positioned in anyone of a number of different positions in the casing radially extending from the axis of rotation of the support plate for the crystal holder. Two carriages are movably supported on the support and guide rail and lockable relative thereto in desired positions. One of the carriages carries the specimen holder, whereas the other carriage can be mechanically coupled or connected to the film holder so as to determine the position of the film holder. The principal advantage of this X-ray camera is that it can easily and rapidly be adjusted for different wavelengths of the X-ray radiation used for the diffraction analysis.

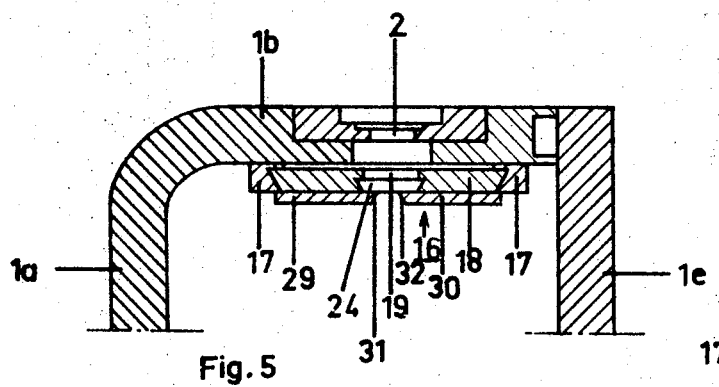
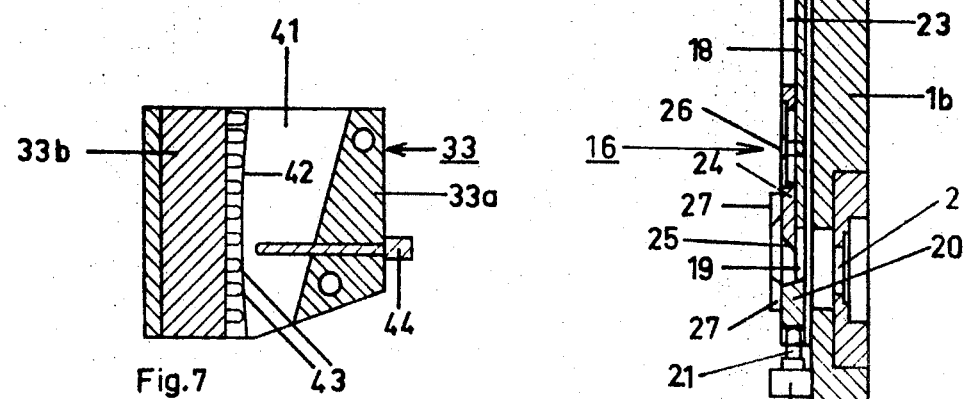
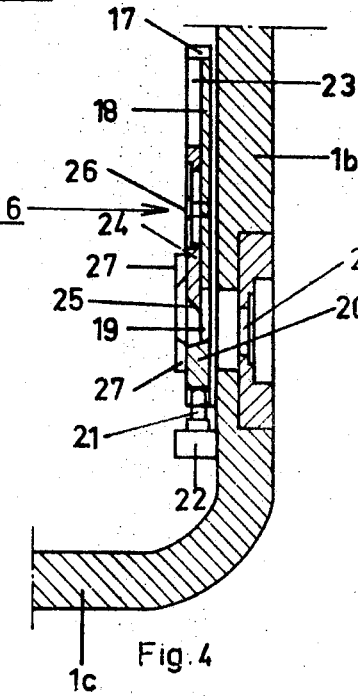
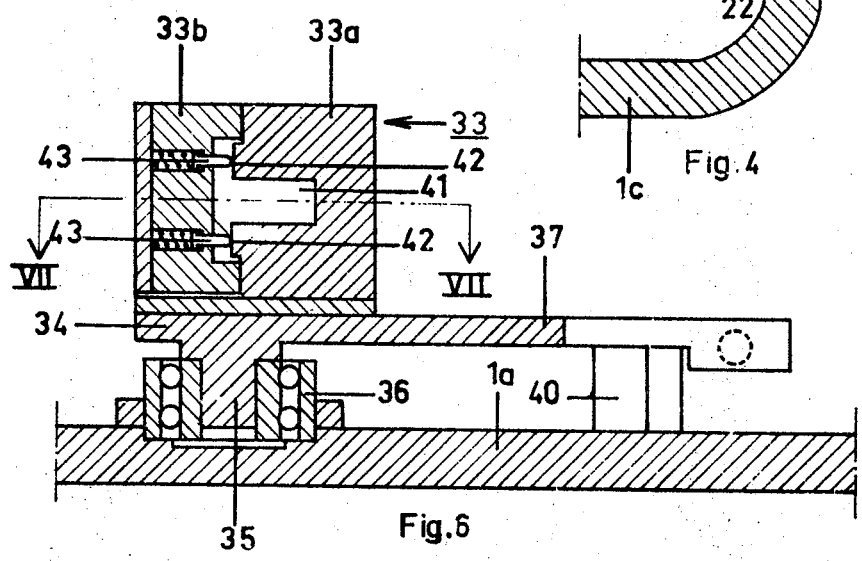

X-RAY CAMERA FOR X-RAY DIFFRACTION ANALYSIS ACCORDING TO GUINIER

The present invention relates to an X-ray camera for X-ray diffraction analysis of powderous material according to the so called Guinier method.

Figure 1:
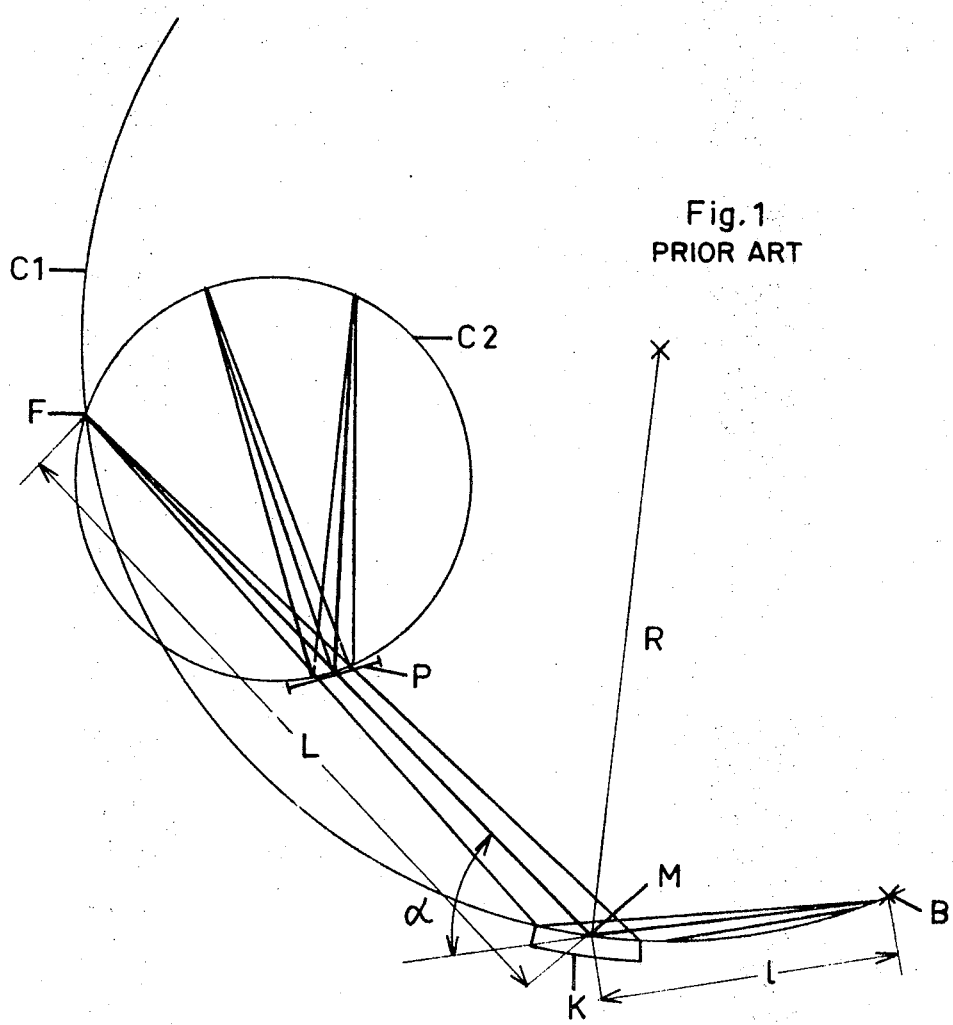

Referring to the drawings, FIG. 1 illustrates the principle for X-ray diffraction analysis according to Guinier. The radiation emitted from the focal spot B of an X-ray tube is directed as a diverging beam of polychromatic radiation towards a monochromator crystal K of quartz. This crystal is bent so that the reflecting planes in the crystal structure have a radius of curvature of 2R. For a certain angle of incidence of the polychromatic radiation from the X-ray tube the crystal reflects a converging beam of radiation, which comprises only a very narrow portion of the spectrum of the incident radiation and which is consequently substantially monochromatic. The reflected radiation beam encloses with the incident radiation beam a predetermined angle $\alpha$ and is focused at a point F located on a circle C1, which has the radius R and passes through the focal spot B and the center of the reflecting crystal surface. The reflecting surface of the crystal is generally ground so as to have the radius of curvature 2R when the crystal is in the unbent state, whereby the reflecting crystal surface is given the radius of curvature R of the focusing circle when the crystal is bent to give the crystal planes the radius of curvature 2R. Further the crystal is generally adjusted in such a position that reflected radiation beam contains the $K\alpha_1$-line in the characteristic radiation from the X-ray tube. The specimen P to be tested is positioned in the monochromatic radiation beam from the crystal K. The specimen consists of a powder spread in a thin layer. The specimen plane can be perpendicular to the axis of the radiation beam or form an oblique angle thereto, as illustrated in FIG. 1. When the monochromatic radiation beam passes through the specimen it is refracted in a predetermined number of predetermined separate directions (only two of them are shown in FIG. 1). The number of separate refracted radiation beams and their directions is determined by the nature of the specimen. All the refracted radiation beams focus on a circle C2, which passes through the focusing point F for the unrefracted radiation beam and has the specimen plane P as a tangent. If a radiation-sensitive film mounted along the circle C2 is exposed to the unrefracted radiation beam and the separate radiations beams refracted by the specimen, this film will consequently after development display a number of separate, mutually spaced lines. From this pattern or spectrum of lines it is possible to determined the nature and/or the characteristics of the tested specimen.

Various devices and apparatus for X-ray diffraction analysis according to the Guinier method are already known. All these previous apparatus or X-ray cameras have, however, the very serious disadvantage that the handling of them is time consuming and cumbersome and requires highly skilled personnel, therefore they are not suitable for routine tests or for applications where a large number of analyses are to be made in a short time. The main reason for this is that in most cases it is desired that the same apparatus be used for X-ray diffraction analyses with several different wavelengths of radiation, that is with the use of different X-ray tubes with different anticathode materials. Anticathode materials which are used for X-ray diffraction analysis are for instance copper, chromium, cobalt, iron and molybdenum. When the wavelength is changed, however, the angle $\alpha$ between the radiation beam incident to the monochromator crystal K and the reflected monochromatic radiation beam from the crystal changes considerably for instance from about 27° for $Cu-K\alpha_1$ to about 40° for $Cr-K\alpha_1$. Due to this the focusing point F is displaced at the same time as the distance L between the focusing point F and the center M of the crystal surface changes. In order to avoid that the total dimensions of the camera system be changed too much when the wavelength is changed, it is desirable in most cases, when changing the wavelength, also to change the value of the radius R of the focusing circle C1, that is to exchange the crystal, in which case it is generally also necessary to change the angle of incidence of the radiation beam directed towards the crystal as well as the distance l between the center M of the crystal surface and the focal spot B in the X-ray tube. However, it is not possible to prevent that the position of the focusing point F as well as the distance L between the focusing point F and the center M of the crystal surface are changed when the wavelength of the radiation is changed. A change of wavelength requires consequently that the crystal be exchanged, that the angular position of the crystal relative to the incident radiation beam be changed, that the distance L between the center M of the crystal surface and the focal spot B of the X-ray tube be adjusted, and that the positions of the film holder, corresponding to the circle C2, and of the specimen holder for the specimen P be changed. The adjustment and setting of all angles and distances must be very accurate in order to obtain a satisfactory result from the analysis. In previous apparatus and cameras for X-ray diffraction analysis according to the Guinier method, all these necessary adjustments after a changing of the wavelength of the radiation are very cumbersome and time consuming.

Further it is desired that the complete apparatus or camera is enclosed in a sealed and evacuated casing of a radiation-shielding material so that the absorption and the dispersion of the radiation in the air and the secondary radiation from the air are prevented from affecting the analysis and so that the personnel operating the apparatus are protected against the radiation. The previous Guinier cameras adjustable for different wavelengths have not been designed in this way.

Further, the X-ray camera should preferably be so constructed that it can easily be mounted as a unit on the casing of a conventional X-ray tube having a vertical axis in front of a radiation exit window in the tube casing. As the conventional X-ray tube casings are provided with four exit windows facing in mutually perpendicular directions, the dimensions of the camera should preferably permit that similar cameras or other X-ray apparatus are mounted also in front of the other exit windows of tube casing, whereby the X-ray tube can be effectively used.

Are object of the present invention is therefore to provide an X-ray camera for X-ray diffraction analysis according to the Guinier method, which camera can easily and rapidly be adjusted for different radiation wavelengths, is completely enclosed in a airtight, evacuated casing, can easily be mounted on the casing of an X-ray tube in front of an radiation exit window in the casing, and has such small dimensions that it does not prevent the mounting of additional similar cameras or other X-ray apparatus in front of the other exit windows in the X-ray tube casing.

Consequently the invention is related to an X-ray camera for X-ray diffraction analysis on powderous specimens according to the Guinier method, comprising an airtight and evacuatable casing having an entrance window for the X-ray radiation, in which casing a crystal holder for a monochromator crystal, a specimen holder and a film holder are mounted. The camera according to the invention is characterized by a support member for the crystal holder rotatable about an axis perpendicular to the direction of radiation incident through the entrance window in the casing, a support and guide rail mountable in different positions radially extending from the axis of rotation of the support member for the crystal holder, and two carriages mounted on the support and guide rail so as to be displaceable along the rail, the specimen holder being mounted on one of said carriages and the film holder being mechanically connected or coupled to the other carriage in such a way that the position of the film holder is determined by the position of the other carriage on the guide rail.

Preferably the crystal holder is removably mounted on the rotatable support member so that it can easily be exchanged for substitution of a crystal with another radius of curvature when the radiation wavelength is to be changed. Further, the axis of rotation of the support member for the crystal holder is preferably horizontal, whereby the radiation beam incident through the entrance window of the casing towards the monochromator crystal, the monochromatic radiation beam reflected from the crystal and the various refracted radiation beams from the specimen will all be disposed in one and the same vertical plane. In this way the total dimension of the camera in the direction perpendicular to the vertical plane will be comparatively small so that the camera when mounted on an X-ray tube having a vertical axis does not prevent other cameras or apparatus from being mounted in front of the other exit windows in the casing of the X-ray tube.

Further, the rotatable support plate for the crystal holder is preferably provided with a radially projecting lever, the outer end of which is kept by, for instance, a spring force against a micrometer stationarily mounted in the casing. By means of this micrometer the support plate and thus the crystal holder and the crystal mounted therein can be rotated to different angular positions.

When changing the radiation wavelength the camera can consequently be adjusted comparatively easily in that:
  a. the crystal holder is replaced with another crystal holder provided with a crystal for the new desired wavelength;
  b. by means of the micrometer the support plate of the crystal holder is rotated to a new predetermined angular position, which can be read off from the scale on the micrometer;
  c. the support and guide rail is moved to a new predetermined position indicated in the casing by suitable markings;
  d. the two carriages on the guide rail are moved to new predetermined positions indicated for instance on a scale on the guide rail.

The support and guide rail can be pivotable about the same axis as the support plate of the crystal holder and lockable in different angular positions indicated in the casing in any suitable manner. Alternatively the casing can be provided with stationary fastening means, as for instance screw holes in a wall of the casing, for fastening the guide rail in different positions corresponding to the different radiation wavelengths for which the camera is to be used.

The film holder is preferably freely supported on the support and guide rail and provided with a contact surface, which is perpendicular to the longitudinal direction of the guide rail and rests, for instance under the influence of the gravity force, against a corresponding contact surface on the second carriage on the guide rail. In this way the position of the film holder along the guide rail is determined by the second carriage and at the same time the film holder can very easily and rapidly be removed from the camera for film exchange.

Figure 2:
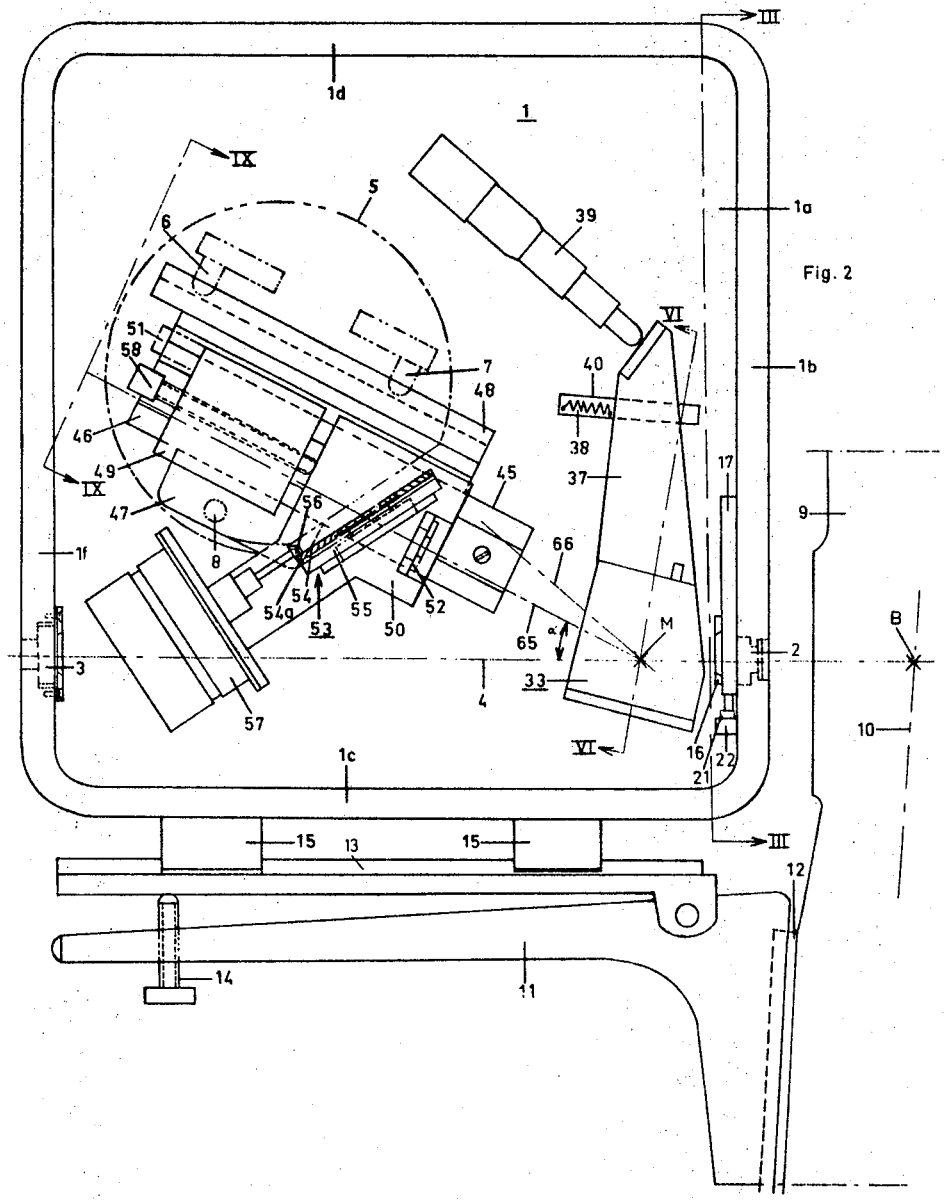
Figure 3:
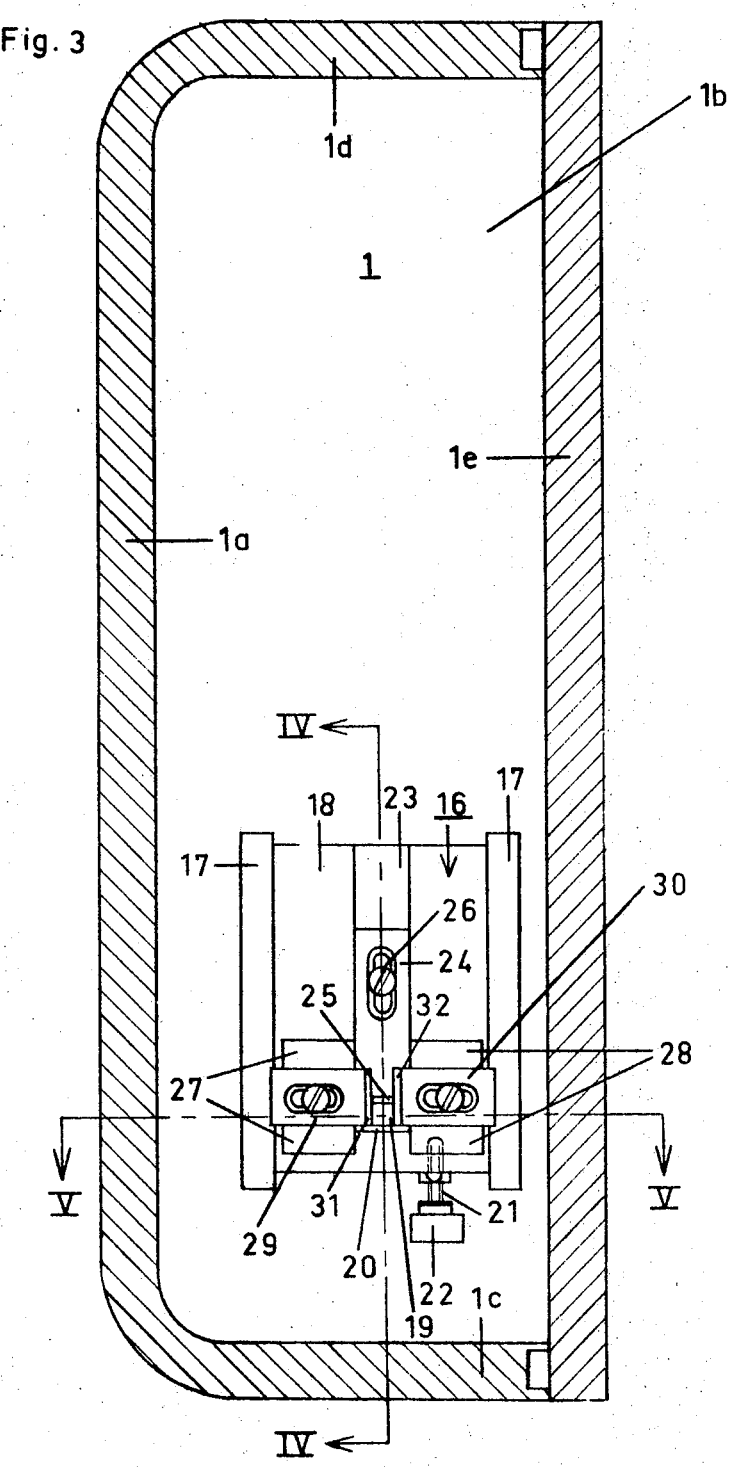
Figure 8:
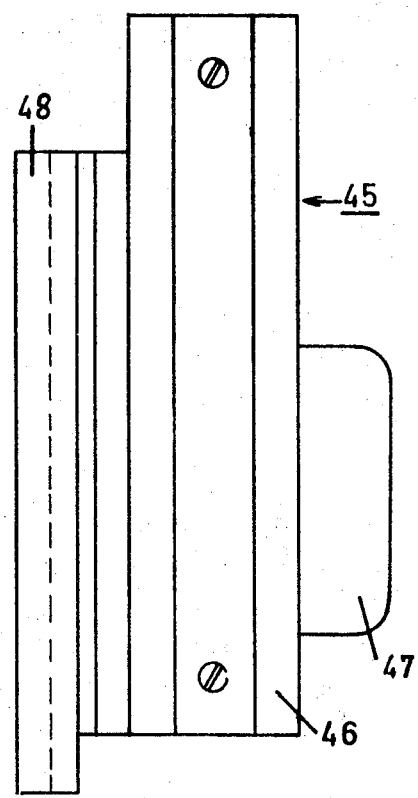
Figure 9:
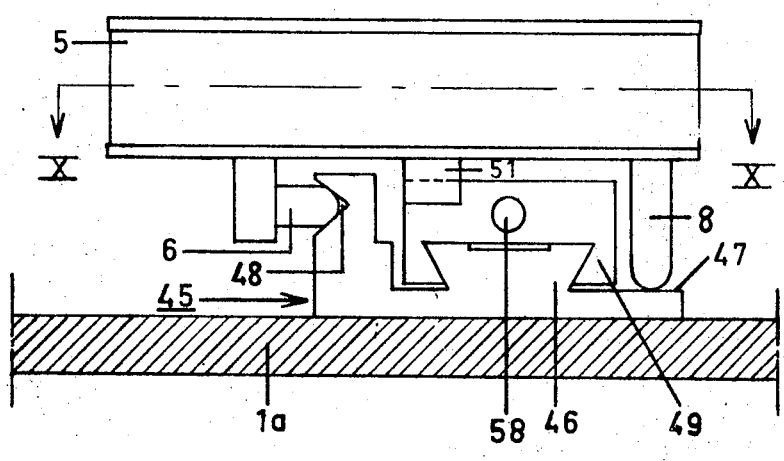
Figure 11:
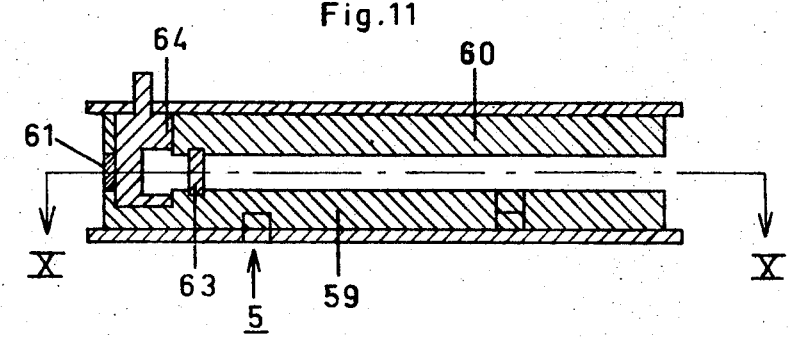
Figure 10:
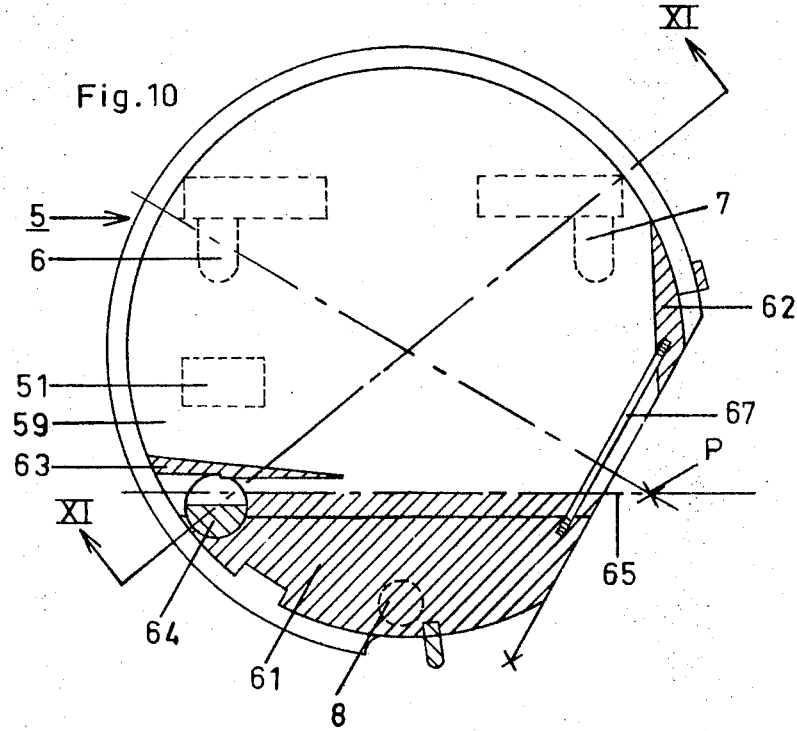

In the following the invention will be further described with reference to the accompanying drawings, in which:

FIGS. 2 to 11 show a preferred embodiment of the invention, by way of example;

FIG. 1 being a view illustrating the principle for an X-ray diffraction analysis according to Guinier;

FIG. 2 being a side view of the camera mounted on an X-ray tube shown only partially and schematically and with the lid of the camera casing removed;

FIG. 3 being a vertical cross-sectional view through the camera along the line III–III in FIG. 2 showing an aperture device mounted at the radiation entrance window of the camera casing;

FIG. 4 being a vertical cross-sectional view through the aperture device along the line IV–IV in FIG. 3;

FIG. 5 being a horizontal cross-sectional view through the aperture device and the entrance window along the line V–V in FIG. 3;

FIG. 6 being a cross-sectional view along the line VI–VI in FIG. 2 showing the crystal holder and the rotatable support plate for the crystal holder;

FIG. 7 being a cross-sectional view through the crystal holder along the line VII–VII in FIG. 6;

FIG. 8 showing the support and guide rail;

FIG. 9 being an end view of the guide rail, one of the carriages mounted on the guide rail and the film holder, this end view being taken along the line IX–IX in FIG. 2;

FIG. 10 being a cross-sectional view through the film holder along the line X–X in FIG. 9; and FIG. 11 being a cross-sectional view through film holder along the line XI–XI in FIG. 10.

As illustrated in FIGS. 2 and 3 the X-ray camera according to the invention comprises a casing 1 having a main wall 1a, on which most of the components of the camera are mounted, a front wall 1b provided with an entrance window 2 for the X-ray radiation, a rear wall 1f provided with a lead-glass window 3 located opposite to the radiation entrance window 2 along the desired direction of incidence 4 for the X-ray radiation, a bottom 1c and a roof 1d. The casing can be closed airtightly with a lid 1e and connected to an evacuation pump in any suitable manner not shown in detail in the drawing. In FIG. 2 the lid 1e is removed to show the camera components mounted inside the casing. For the sake of clarity the film holder is also removed and only the outlines of the film holder 5 and its three support feet 6, 7 and 8 are indicated by dotted lines.

FIG. 2 shows the camera mounted on an X-ray tube, of which only the casing 9 is shown partially and schematically. The axis of the tube is designated by numeral 10 and its focal spot with B. The camera is mounted on the casing 9 by means of a cantilever 11 which is mounted on a guide rail 12 on the casing 9. The position of the cantilever 11 along the guide rail 12 can be adjusted and the cantilever can be locked in its adjusted position. The cantilever 11 is also provided with a support rail 13 which can be adjusted by means of a screw 14 and be locked in its adjusted position. The camera casing 1 stands on the support rail 13 by two feet or carriages 15. The camera can be moved along the rail 13 and be locked relative this in its adjusted position. The desired direction 4 for the incident X-ray radiation through the entrance window 2 is parallel to the support rail 13. By variation of the inclination of the rail 13 by means of the screw 14 it is possible to determine the angle between the direction 4 of the incident radiation and the axis 10 of the X-ray tube, that is the angle between the central ray in the incident radiation beam and the anticathode surface of the X-ray tube. The axis 10 of the X-ray tube is assumed to be vertical. An apparatus support cantilever 11 of the illustrated type is generally a standard equipment on most X-ray tubes, as for instances those manufactured by Philips.

Inside the entrance window 2 an aperture device 16 is mounted in two vertical guideways 17 attached to the inside of the front vertical guideways 17 attached to the inside of the front wall 1b of the casing, as illustrated in FIG. 2, 3, 4 and 5. The aperture device 16 comprises a base plate 18, which is insertable and adjustable in vertical direction in the two guideways 17 and which, opposite to the window 2, is provided with an aperture opening 19, which is restricted downwards by a lower horizontal aperture edge 20. The vertical position of the base plate 18 and thus of the lower horizontal aperture edge 20 can be set by means of a screw 21, which can be screwed more or less into the lower edge of the plate 18 and the head of which rests against a boss 22 attached to the inside of the front wall 1b of the casing. Further, the base plate 18 is provided with a vertical slideway 23, in which a slide 24 can be moved vertically. The lower end of this slide 24 is shaped to form an upper horizontal aperture edge 25. The slide 24 can be locked in an adjusted position relative to the base plate 18 by means of a locking screw 26 positioned in an elongated slot in the slide 24. On the base plate 18 two horizontal slideways 27 and 28 are also mounted, in which two slides 29 and 30 respectively are movable in horizontal direction. The ends of the two slides 29 and 30 facing towards each other are shaped to form vertical aperture edges 31 and 32 respectively. The slides 29 and 30 and thus the two vertical aperture edges 31 and 32 can be locked in adjusted positions relative to the base plate 18 by means of locking screws positioned in elongated slots in the slides. By means of the three slides 24, 29 and 30 and the screw 21 it is consequently possible to determine very accurately a rectangular aperture opening with a desired size and a desired position relative to the entrance window 2. The complete aperture device can be removed as a unit without any changes in the adjustment of the aperture device in that the base plate 18 is simply withdrawn from the guideways 17. This is very advantageous, as it makes it possible to substitute very easily and rapidly one aperture device for another aperture having a different size or position of the aperture opening. Such a substitution is necessary when the radiation wavelength is changed, as this requires replacement of the monochromator crystal relative to the incident radiation. It is consequently possible to have an accurately preset aperture device for each radiation wavelength that is to be used in the camera.

Inside the entrance window 2 and the aperture device 16 the crystal holder 33 for the monochromator crystal is mounted. As most readily seen in FIGS. 2 and 6, the crystal holder 33 is removably mounted on a support or base plate 34, which is mounted on the main wall 1a of the casing by means of a pivot pin 35 and a bearing 36 so that is is rotatable about an axis M (FIG. 2) which is perpendicular to the main wall 1a of the casing and thus horizontal and which coincides with the central line on the reflecting surface of the crystal K mounted in the crystal holder 33 (compare FIG. 1). The axis of rotation M of the crystal holder 33 and thus the centerline of the crystal intersects the central ray 4 in the incident radiation beam through the entrance window 2. The support plate 34 for the crystal holder 33 is provided with a radially projecting arm 37, the outer end of which is kept by a tension spring 38 against a micrometer 39 mounted on the main wall 1a of the casing. By means of the micrometer 39 it is possible to vary and adjust the angular position of the support plate 34 and thus the crystal holder 33 and the crystal mounted therein relative to the radiation direction 4. The arm 37 of the support plate 34 rests on a support 40 and can be locked relative to this in its adjusted position in any suitable manner not shown in detail in the drawing.

As illustrated in FIGS. 6 and 7 the crystal holder 33 consists of two portions or halves 33a and 33b, which are joined in any suitable manner as for instance by means of screw bolts. The one half 33a of the crystal holder has a recess 41 extending through the crystal holder for the radiation and on opposite sides of this recess two contact surfaces 42 shaped as areas of circles and having a radius of curvature corresponding to the desired radius of curvature for the crystal. It should be noted that in FIGS. 6 and 7 the crystal holder is shown without any crystal mounted therein. The crystal chip is pressed against the two contact surfaces 42, that is in the desired bent position, by spring biased pins 43 mounted in the other half 33b of the crystal holder. The half 33a of the crystal holder is also provided with an adjustable and in adjusted position lockable aperture slide 34.

On the main wall 1a of the casing also a support and a guide rail 45 is mounted, as for instance by means of screws threaded into the main wall 1a of the casing. The main wall 1a is provided with several different sets of screw holes for the mounting screws of the guide rail 45, whereby this can be mounted in different positions radially extending from the centerline M of the monochromator crystal and corresponding to different radiation wavelengths. In FIG. 2 two different radial directions 65 and 66 for the guide rail 45 are indicated. Instead of mounting the guide rail 45 by means of screws in different positions on the main wall 1a of the casing the guide rail could be pivoted about the same axis M as the support plate 34 for the crystal holder 33 and be lockable in any suitable matter in different angular positions.

The guide rail 45 is shown in detail in FIGS. 8 and 9. It is provided with a slideway 46 extending in the longitudinal direction of the guide rail, a vertical plane support surface 47 and a V-shaped guide groove 48 extending parallel to the longitudinal direction of the guide rail. As can be seen in FIG. 2, two carriages or slides 49 and 50 are mounted on the slideway 46 of the guide rail so as to be movable along the slideway and lockable relative to this in any desired positions. The first slide or carriage 49 determines the position of the film holder 5. However, the film holder is not supported by the carriage 49 but rests instead freely on the guide rail 45 with three pin-shaped support feet 6, 7 and 8 provided on the lower surface of the film holder (compare FIGS. 2 and 9). The two support pins 6 and 7 rest in the V-shaped guide groove 48 on the guide rail 45, whereas the support pin 8 rests against the vertical support surface 47 on the guide rail 45. Consequently, the film holder 5 can very easily be removed from the guide rail 45 and a repositioned thereon when the film in the film holder is to be exchanged. The position of the film holder in the longitudinal direction the guide rail 45 is determined by the carriage 49 in that the lower side of the film holder is provided with projection 51, which rests against the rear end surface of the carriage 49 under influence of the weight of the film holder.

The second carriage 50 on the guide rail 45 carries a specimen aperture 52 and a specimen holder 53 (compare FIG. 2). The specimen holder 53 comprises a specimen holder ring 54, which is rotatable in a support ring 55 stationarily mounted on the carriage 50. The specimen holder ring 54 has a central opening, in which the specimen can be mounted, for instance attached to a plastic film by means of a suitable binder or directly on an adhesive tape. The rotatable specimen holder ring 54 is provided with a gear ring 54a, which is in engagement with a gear wheel 56 driven by a motor 57 mounted on the carriage 50. In this way it is possible to rotate the specimen, which is advantageous when the specimen is not sufficiently fine. By rotation of the specimen the results from the separate particles of the powderous specimen are integrated, whereby more distinct and less grained lines are obtained on the exposed film.

The mutual spacing between the two carriages 49 and 50 and thus the position of the specimen relative to the film may be adjusted with high accuracy by the aid of a screw 58, which is threaded through the carriage 49 and the end of which rests against the rear end surface of the carriage 50. The position of the specimen plane relative to the film is, as explained in the foregoing with reference to FIG. 1, independent of the wavelength of the radiation used, wherefore the screw 58 can be set once for all and be locked in any suitable manner in its adjusted position.

The film holder 5 is shown more in detail in FIGS. 10 and 11. It comprises two heavy plates 59 and 60 which are joined and held mutually parallel and spaced by spacer members 61, 62, and 63. The side of the film holder facing the specimen, which is positioned in the point P, is provided with an entrance window 67 for the unrefracted radiation beam 65 as well as the various radiation beams which have been refracted in the specimen P. Along the open portion of the circumference of the film holder a film can be strapped in any suitable manner not shown in detail in the drawing, as for instance by means of a lead rubber band, so that the film is exposed to the various radiation beams from the specimen P, which radiation beams are focused in different points on the cylinder surface along which the film is mounted; as has been described in the foregoing with reference to FIG. 1. In the path of the unrefracted radiation beam 65 rotatable shutter 64 is mounted, by means of which this radiation beam can be screened off from the film. The intensity of the unrefracted radiation beam is much larger than the intensity of the radiation beams refracted in the specimen, wherefore the time of exposure should be shorter for the unrefracted radiation beam so that it does not give a too heavy line on the film.

From the foregoing it should be appreciated that the handling of the X-ray camera according to the invention is very simple in normal use and when the radiation wavelength shall be changed. It is only necessary that from the beginning the camera is set and tested for each one of the various radiation wavelengths that may in the future be used for the camera and that the various adjustments or settings for each radiation wavelength are recorded. When in the future the radiation wavelength shall be changed only the following comparatively simple steps or operations are necessary:

1. The crystal holder 33 is replaced by a new crystal holder provided with the crystal for the new wavelength;
2. by means of the micrometer 39 the crystal is positioned in the previously determined and recorded angular position for the new wavelength;
3. the entrance aperture device 16 is replaced by a new aperture device, which has been preset for the new wavelength;
4. the film holder 5 is removed from the support and guide rail 45, which is unfastened from the main wall 1a of the casing and refastened in the position associated with the new wavelength;
5. the two carriages 49 and 50 are loosened so that they can be moved along the guide rail 45 and the carriage 49 is adjusted to the position recorded for the new wavelength by aid of markings, a scale or similar on the guide rail 45 and is relocked in its new position;
6. the carriage 50 is positioned so that its rear end surface rests against the setting screw 58 in the carriage 49 and is thereafter relocked in its new position;
7. the camera casing 1 is moved along the guide way 13 on the cantilever 11, so that the distance between the center line M of the crystal and the focal spot B in the X-ray tube is adjusted to the value required for the new wavelength. This can be determined by means of markings or a scale on the guide way 13 or by means of spacer rings associated with the new wavelength which are inserted between the front wall 1b on the casing and the casing 9 of the X-ray tube.

The complete adjustment on the camera when the wavelength is to be changed can be performed comparatively rapidly by the aid of settings or adjustment values, which have been determined once for all and recorded.

If the angle between the direction 4 of the incident radiation beam and the anticathode surface of the X-ray tube shall be changed when the wavelength is changed, this can be done, as explained in the foregoing, by means of the adjustment screw 14 on the cantilever 11 either by the aid of a suitable scale or a spacer inserted between the cantilever 11 and its slideway 13.

The vertical position of the camera can be checked and adjusted in that a fluorescent plate is inserted in front of the lead-glass window 3, whereby it will be possible from the outside of the camera casing and through the lead-glass window 3 to observe the incident radiation through the entrance window 2, when the crystal holder 33 has been removed. That the central ray in the incident radiation beam coincides with the direction 4 indicated in FIG. 2 can be checked in that the entrance aperture device 16 is replaced by a special aperture device, which screens the incident radiation beam according to a particular pattern, and in that a metal disc having a matching particular pattern is inserted between the fluorescent plate and the lead-glass window 3. When it can be observed from the outside of the camera casing through the lead-glass window 3 that the two patterns coincide or have a predetermined mutual position, this means that the central ray in the incident radiation beam coincides with the direction 4, that is that the vertical position of the camera casing is correct. The vertical position of the camera casing can be adjusted, as explained in the foregoing, in that the cantilever 11 is moved along the guideway 12 on the casing 9 of the X-ray tube. It should be appreciated that of course it is not necessary to adjust or change the vertical position of the camera casing when the wavelength is changed but only when the camera casing is remounted on the tube casing 9 after having been removed therefrom. By means of a suitable marking or scale on the guideway 12 and the cantilever 11 it may be possible to determine the correct vertical position of the camera once for all.

I claim:

1. An X-ray camera for X-ray diffraction analysis on powderous material according to the Guinier method, comprising an airtight and evacuatable casing provided with an entrance window for a beam of X-ray radiation, a crystal holder for a monochromator crystal, a support member for said crystal holder mounted inside said casing so as to be rotatable about an axis perpendicular to the direction of said beam of X-ray radiation through said entrance window, an elongated support and guide member mounted inside said casing having its longitudinal direction extending radially relative the axis of rotation of said support member, a first carriage mounted on said elongated guide member movable in the longitudinal direction of the guide member and lockable relative thereto in selected positions, a specimen holder for a specimen to be tested mounted on said first carriage, a second carriage mounted on said elongated guide member movable in the longitudinal direction thereof and lockable relative thereto in selected positions, and a film holder for an X-ray film mechanically coupled to said second carriage, the position of said film holder determined by the selected position of said second carriage.

2. An X-ray camera as set forth in claim 1 to be used in combination with an X-ray tube having a vertical tube axis and an exit window for a beam of X-ray radiation substantially perpendicular to the tube axis, comprising mounting means for mounting said casing with said entrance window in front of said exit window and the axis of rotation of said support member for said crystal holder being substantially horizontal.

3. An X-ray camera as set forth in claim 1, wherein said elongated guide member is pivoted about the axis of rotation of said support member of said crystal holder, whereby the guide member can be moved to different selected positions, each of said selected positions having the longitudinal direction of the guide member extending radially relative to the axis of rotation of the support member for the crystal holder.

4. An X-ray camera as set forth in claim 1, comprising mounting means in said casing for mounting said elongated support and guide member in any selected one of at least two different positions each having the longitudinal direction of the guide member extending radially relative to the axis of rotation of said support member for said crystal holder.

5. An X-ray camera as set forth in claim 1, wherein said second carriage is provided with a first support surface perpendicular to the longitudinal direction of said elongated guide member, and said film holder is provided with a second support surface corresponding to said first support surface, the film holder being freely supported on said elongated guide member with said second support surface resting against said first support surface under the action of a predetermined force.

6. An X-ray camera as set forth in claim 5, wherein said predetermined force is gravity.

7. An X-ray camera as set forth in claim 1, wherein said elongated support and guide member has a first plane surface parallel to the longitudinal direction of the guide member and to the axis of rotation of said support member for said crystal holder and a second plane surface perpendicular to said first surface, said first surface having a guide groove provided therein extending parallel to the longitudinal direction of the guide member, said second carriage being provided with a first support surface perpendicular to the longitudinal direction of said elongated guide member, and said film holder being provided with a second support surface corresponding to said first support surface and with two spaced and parallel first support pins projecting from the film holder in a direction perpendicular to said first surface of said guide member and with a second support pin projecting from the film holder in a direction perpendicular to said second surface of said guide member, the film holder being freely supported on said guide member with said first pins resting in said guide groove, said second pin resting against said second surface of the guide member and said second support surface of the film holder resting against said first support surface of said second carriage under the action of gravity.

8. An X-ray camera as set forth in claim 1, comprising a variable spacer member on one of said first and second carriages for determining the mutual spacing between said first and second carriages in the longitudinal direction of said elongated support and guide member.

9. An X-ray camera as set forth in claim 1, comprising a lever having one end attached to said support member for said crystal holder and extending substantially radially therefrom, micrometer means stationarily mounted in said casing, and spring means urging the opposite end of said lever against said micrometer means, whereby the angular position of said support member about its axis of rotation can be varied by the aid of said micrometer means.

10. An X-ray camera as set forth in claim 1, wherein said crystal holder is removably mounted on said support member.

11. An X-ray camera as set forth in claim 1, comprising an interchangeable aperture means mounted inside said casing in front of said radiation entrance window, said aperture means including two spaced and parallel first aperture edges extending in a first direction and movable in a second direction perpendicular to said first direction and two spaced and parallel second aperture edges extending in said second direction and being movable in said first direction.